US012771001B2

United States Patent
(12) United States Patent
Wang et al.

(10) Patent No.: US 12,771,001 B2
(45) Date of Patent: Oct. 20, 2026

(54) PHASE SHIFTER, ANTENNA UNIT, AND BASE STATION

(71) Applicant: Telefonaktiebolaget LM Ericsson (publ), Stockholm (SE)

(72) Inventors: Yuesong Wang, Beijing (CN); Zhiming Tian, Beijing (CN); Zhongliang He, Beijing (CN); Jianlan Li, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 397 days.

(21) Appl. No.: 18/288,596

(22) PCT Filed: Apr. 30, 2021

(86) PCT No.: PCT/CN2021/091606

§ 371 (c)(1),
(2) Date: Oct. 27, 2023

(87) PCT Pub. No.: WO2022/227035

PCT Pub. Date: Nov. 3, 2022

(65) Prior Publication Data

US 2024/0213668 A1 Jun. 27, 2024

(51) Int. Cl.
*H01Q 3/32* (2006.01)
*H01P 1/18* (2006.01)
(Continued)

(52) U.S. Cl.
CPC .............. *H01P 1/184* (2013.01); *H01P 5/028* (2013.01); *H01Q 3/32* (2013.01); *H01Q 21/0075* (2013.01); *H01Q 1/246* (2013.01)

(58) Field of Classification Search
CPC .... H01P 1/18; H01P 1/184; H01P 5/02; H01P 5/028; H01Q 1/246; H01Q 3/32; H01Q 21/00; H01Q 21/0075
See application file for complete search history.

(56) References Cited

U.S. PATENT DOCUMENTS 4,146,896 A * 3/1979 Baril .......................... H01P 5/08 333/204
5,504,466 A * 4/1996 Chan-Son-Lint ....... H01P 1/184 333/159
(Continued)

FOREIGN PATENT DOCUMENTS

| | | | |
|---|---|---|---|
| CN | 111952698 | A | 11/2020 |
| CN | 112436249 | A | 3/2021 |
| WO | 0103233 | A1 | 1/2001 |

OTHER PUBLICATIONS

International Search Report and Written Opinion of the International Searching Authority, PCT/CN2021/091606, mailed Jan. 25, 2022, 9 pages.

*Primary Examiner* — Tho G Phan
(74) *Attorney, Agent, or Firm* — Sage Patent Group

(57) ABSTRACT

A phase shifter, an antenna unit, and a base station are disclosed. According to an embodiment, the phase shifter includes a first plate and a second plate slidable relative to the first plate. Two parallel microstrip lines are provided on a first surface of the first plate. A means electrically coupled to the two parallel microstrip lines is provided on a second surface of the second plate that faces to the first surface of the first plate. The means defines a signal transmission path which couples the two parallel microstrip lines, and introduces an infinite impedance at two coupling points on the two parallel microstrip lines where the signal transmission path is coupled to the two parallel microstrip lines.

12 Claims, 8 Drawing Sheets

(51) Int. Cl.

| | |
|---|---|
| ***H01P 5/02*** | (2006.01) |
| ***H01Q 21/00*** | (2006.01) |
| *H01Q 1/24* | (2006.01) |

(56) References Cited

U.S. PATENT DOCUMENTS

| | | | | |
|---|---|---|---|---|
| 6,737,938 | B2 * | 5/2004 | Kitamori | H01Q 3/32<br>343/882 |
| 7,274,331 | B2 * | 9/2007 | Heiniger | H01Q 21/061<br>333/156 |
| 8,847,702 | B2 * | 9/2014 | Lai | H01P 1/184<br>333/128 |
| 8,878,624 | B2 * | 11/2014 | Timofeev | H01P 5/028<br>333/24 C |
| 8,907,744 | B2 * | 12/2014 | Moon | H01P 1/184<br>333/128 |
| 2014/0055211 | A1 | 2/2014 | Segador Alvarez | |
| 2015/0028968 | A1 | 1/2015 | Katipally et al. | |

* cited by examiner

PHASE SHIFTER, ANTENNA UNIT, AND BASE STATION

CROSS REFERENCE TO RELATED APPLICATIONS

This application is a 35 U.S.C. § 371 national stage application of PCT International Application No. PCT/CN2021/091606 filed on Apr. 30, 2021, the disclosure and content of which is incorporated by reference herein in its entirety.

TECHNICAL FIELD

The present disclosure generally relates to the technical field of communication device, and more particularly, to a phase shifter, an antenna unit having the phase shifter, and a base station having the antenna unit.

BACKGROUND

This section introduces aspects that may facilitate better understanding of the present disclosure. Accordingly, the statements of this section are to be read in this light and are not to be understood as admissions about what is in the prior art or what is not in the prior art.

Base station is an important part of a mobile communication system, and may include a radio unit and an antenna unit. Phase shifter is widely used in antenna units which include Remote Electrical Tilt (RET), because it can realize beam scan function. Generally, there are two types of phase shifter based on principle: one via changing a signal propagation path length, and another via changing a dielectric constant of a part of the signal propagation path, which can affect signal propagation velocity.

Currently, for both path length changing phase shifter and dielectric constant changing phase shifter, the phase shifting function needs to be realized by a sliding part. For path length changing phase shifter solution, the output impedance changes as the sliding part changes the phase, which affects the power obtained in the signal propagation path, causing a change in power distribution. For dielectric constant changing phase shifter solution, more extra space is needed for sliding a medium block, which need to follow the signal propagation path; in this case, it makes design more complex and limited by the signal propagation path.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide a phase shifter which has a lower insertion loss.

According to a first aspect of the disclosure, there is provided a phase shifter, which comprises a first plate and a second plate slidable relative to the first plate. Two parallel microstrip lines are provided on a first surface of the first plate. A means electrically coupled to the two parallel microstrip lines is provided on a second surface of the second plate that faces to the first surface of the first plate. The means defines a signal transmission path which couples the two parallel microstrip lines, and introduces an infinite impedance at two coupling points on the two parallel microstrip lines where the signal transmission path is coupled to the two parallel microstrip lines.

In an embodiment of the disclosure, the means introduces an infinite impedance at two first points on the second plate, and a distance between each of the two coupling points and a corresponding first point is an integral multiple of half-wavelength.

In an embodiment of the disclosure, the means comprises a first part on one side of the second surface of the second plate and a separate second part on the other side of the second surface of the second plate. The first part defines the signal transmission path and has two points that correspond to the two coupling points on the two parallel microstrip lines of the first plate. The second part consists of two parallel microstrip lines, each of which has a first end adjacent to the first part and an opposite second end having the first point. A distance between each of the two points of the first part and the second end of a corresponding one of the two parallel microstrip lines of the second plate is an integral multiple of half-wavelength.

In an embodiment of the disclosure, the two parallel microstrip lines of the second plate have the same spacing as that of the two parallel microstrip lines of the first plate.

In an embodiment of the disclosure, the two parallel microstrip lines of the second plate are arranged such that during a travel of the second plate, the first end is always coupled to a corresponding one of the two parallel microstrip lines of the first plate, and the second end does not overlap with the two parallel microstrip lines of the first plate or at most overlaps with a corresponding one of the two parallel microstrip lines of the first plate only at a limit position of the travel of the second plate.

In an embodiment of the disclosure, the means introduces an infinitely small impedance at a second point on each of the two parallel microstrip lines of the first plate, and a distance between each of the two coupling points and a corresponding second point is an odd multiple of a quarter-wavelength.

In an embodiment of the disclosure, the means comprises a first part on one side of the second surface of the second plate and a separate second part on the other side of the second surface of the second plate. The first part defines the signal transmission path and has two points that correspond to the two coupling points on the two parallel microstrip lines of the first plate. The second part comprises a conductive body which couples the two parallel microstrip lines of the first plate to the ground. A distance between each of the two points of the first part and the conductive body is an odd multiple of a quarter-wavelength.

In an embodiment of the disclosure, the ground is provided on the first plate beside the two parallel microstrip lines.

In an embodiment of the disclosure, the conductive body of the second plate and the ground are arranged such that during a travel of the second plate, the conductive body is always coupled to the ground and the two parallel microstrip lines of the first plate.

In an embodiment of the disclosure, the conductive body is a sheet or a bar made of metal.

In an embodiment of the disclosure, the metal is copper.

In an embodiment of the disclosure, the first part is a microstrip line having a shape of U, H, V, W or M.

In an embodiment of the disclosure, a layer of insulating film is provided on the second surface of the second plate and covers the means.

According to a second aspect of the disclosure, there is provided an antenna unit, which comprises a phase shifter according to the first aspect.

According to a third aspect of the disclosure, there is provided a base station, which comprises an antenna unit according to the second aspect.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

The embodiments of the present disclosure are described in detail with reference to the accompanying drawings. It should be understood that these embodiments are discussed only for the purpose of enabling those skilled in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. Those skilled in the relevant art will recognize that the disclosure may be practiced without one or more of the specific features or advantages of a particular embodiment. In other instances, additional features and advantages may be recognized in certain embodiments that may not be present in all embodiments of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Figure 1:
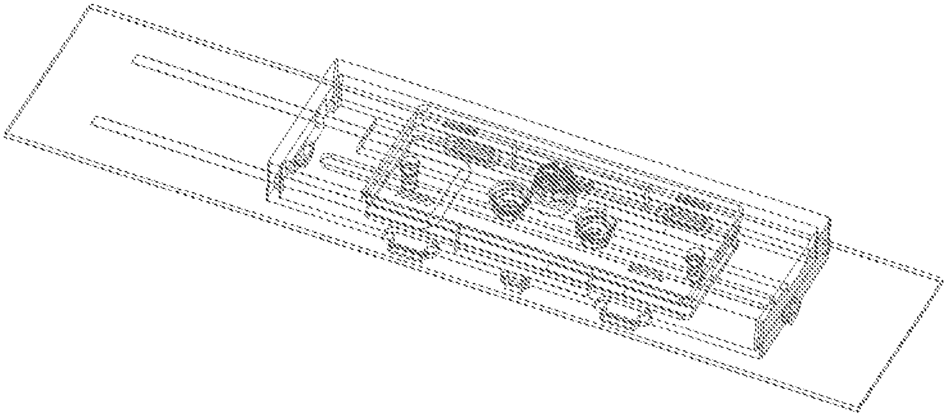
FIG. 1 is a diagram showing a phase shifter according to a first embodiment of the disclosure.
Figure 2:
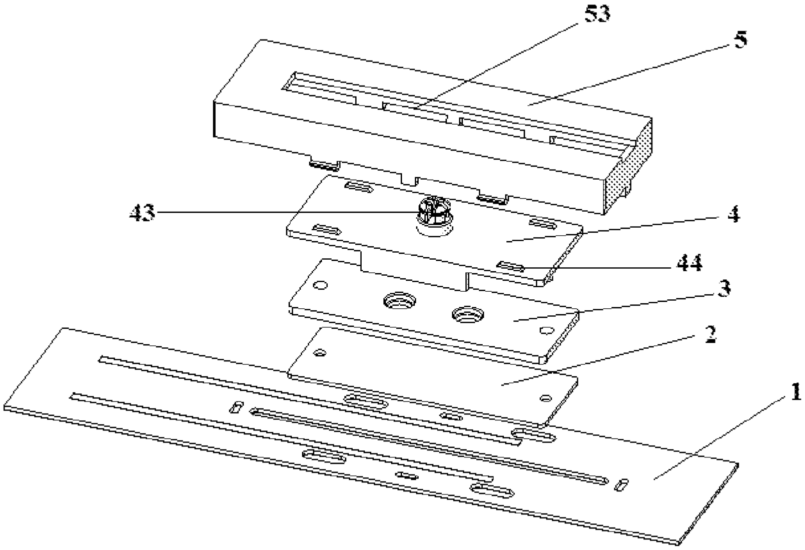
FIG. 2 is an explosive diagram of the phase shifter according to the first embodiment viewed from a top side.
Figure 3:
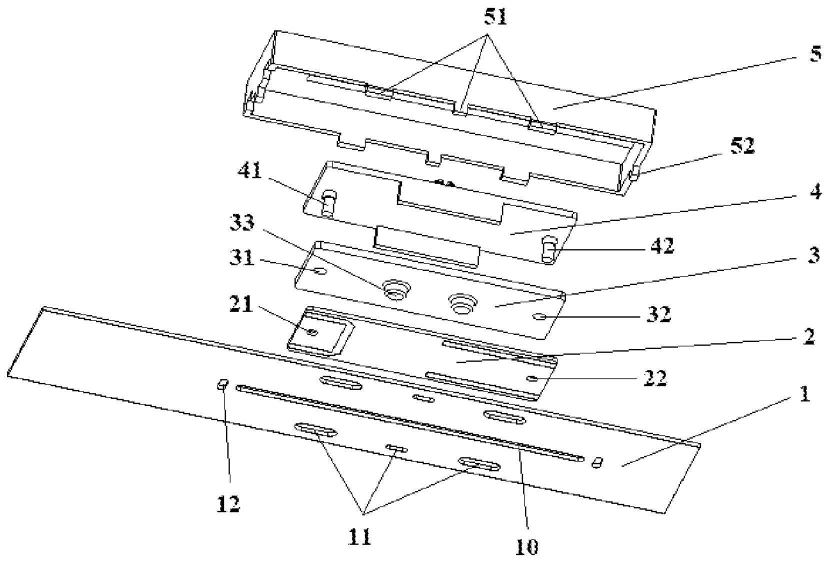
FIG. 3 is an explosive diagram of the phase shifter according to the first embodiment viewed from a bottom side.

Firstly, a phase shifter according to a first embodiment of the disclosure will be described with reference to FIGS. 1-6. FIG. 1 is a diagram showing a phase shifter according to the first embodiment of the disclosure, FIG. 2 is an explosive diagram of the phase shifter according to the first embodiment viewed from a top side, and FIG. 3 is an explosive diagram of the phase shifter according to the first embodiment viewed from a bottom side. As shown in FIGS. 1-3, the phase shifter according to the first embodiment includes a fixed plate ("first plate") 1, a sliding plate ("second plate") 2, a spacer plate 3, a drive plate 4, and a cover 5.

The fixed plate 1 is mounted on a stationary member, such as an antenna reflector plate. The sliding plate 2, the spacer plate 3 and the drive plate 4 are fastened together, so as to form an assembly which is slidable relative to the fixed plate 1. The cover 5 is fixed to the fixed plate 1 and defines a space for housing the assembly formed by the sliding plate 2, the spacer plate 3 and the drive plate 4. In the illustrated embodiment, two pins 41, 42 protrude from a bottom surface of the drive plate 4, extend through corresponding holes 31, 32 formed in the spacer plate 3 and corresponding holes 21, 22 formed in the sliding plate 2, and are inserted into a guiding groove 10 formed in a central portion of the fixed plate 1. Further, at tip ends of side walls of the cover 5, there is provided a plurality of lugs 51, 52, which can be inserted into corresponding holes 11, 12 formed in the fixed plate 1. It should be noted that the way of fastening the sliding plate 2, the spacer plate 3 and the drive plate 4 together or fixing the cover 5 to the fixed plate 1 is not limited to the illustrated one.

Each of the fixed plate 1, the sliding plate 2, the spacer plate 3, the drive plate 4 and the cover 5 may be made of plastic, for example. As can be seen from FIG. 3, the spacer plate 3 is provided with two elastic parts 33, which may be made of rubber, for example. As can be seen from FIG. 2, the drive plate 4 is provided with a drive portion 43 on a central portion of its top surface. For example, the drive portion 43 may be connected to an output shaft of a step motor. A groove 53 is formed at a top plate of the cover 5, and the drive portion 43 can slide in the groove 53. On the top surface of the drive plate 4, four protrusions 44 are provided, which can reduce friction between the drive plate 4 and the top plate of the cover 5.

Figure 4:
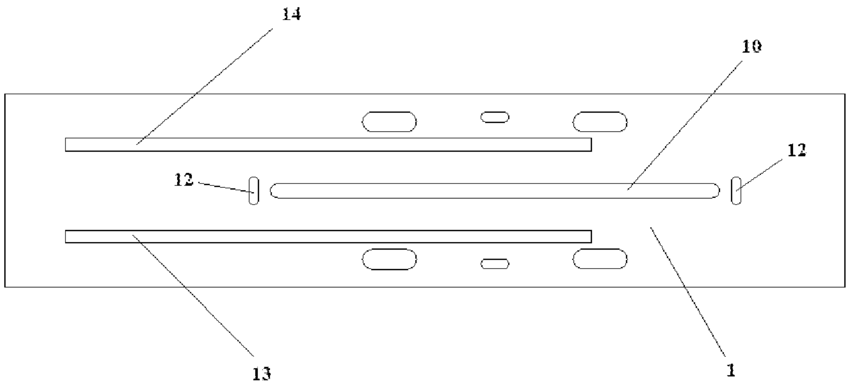
FIG. 4 is a top view of a fixed plate of the phase shifter according to the first embodiment.

Hereinafter, the fixed plate 1 and the sliding plate 2 will be described in detail with reference to FIGS. 4-6. FIG. 4 illustrates a top view of the fixed plate 1, FIG. 5 illustrates a bottom view of the sliding plate 2, and FIG. 6 illustrates an assembly of the fixed plate 1 and the sliding plate 2.

As shown in FIG. 4, two parallel microstrip lines 13, 14 are provided on a top surface ("first surface") of the fixed plate 1. The guiding groove 10 and two holes 12 are located between the two parallel microstrip lines 13, 14.

Figure 5:
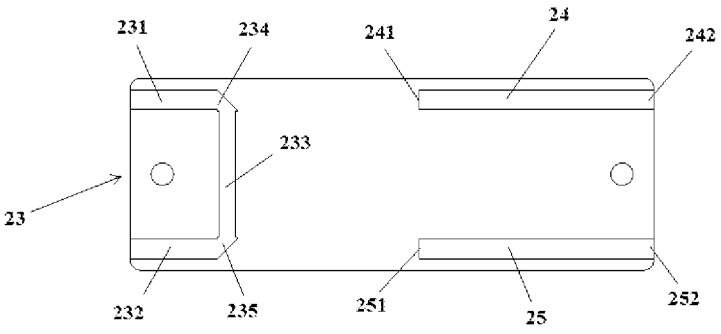
FIG. 5 is a bottom view of a sliding plate of the phase shifter according to the first embodiment.
Figure 6:
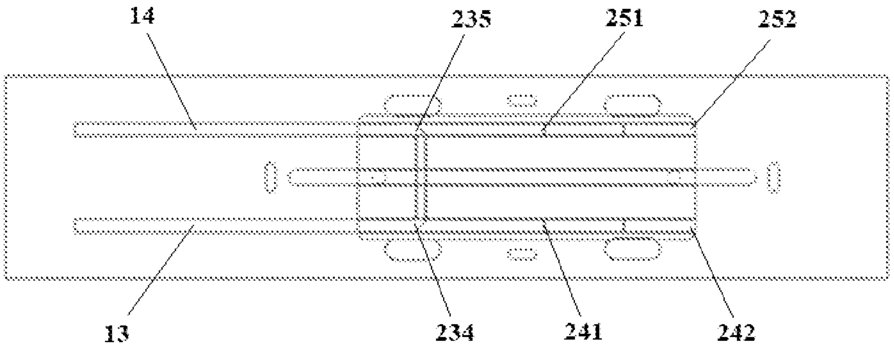
FIG. 6 is a diagram showing an assembly of the fixed plate and the sliding plate of the phase shifter according to the first embodiment.

As shown in FIG. 5, a U-shaped microstrip line ("first part") 23 is provided on the left end ("one side") of a bottom surface ("second surface") of the sliding plate 2, and two parallel microstrip lines ("second part") 24, 25 are provided on the right end ("the other side") of the bottom surface of the sliding plate 2. The U-shaped microstrip line 23 and the two parallel microstrip lines 24, 25 form a means that is electrically coupled to the two parallel microstrip lines 13, 14 of the fixed plate 1 when the fixed plate 1 and the sliding plate 2 are assembled together.

More specifically, the U-shaped microstrip line 23 has two legs 231, 232 and a connecting bar 233. The spacing between the two legs 231, 232 of the U-shaped microstrip line 23 is the same as the spacing between the two parallel microstrip lines 13, 14 of the fixed plate 1. Also, the two parallel microstrip lines 24, 25 of the sliding plate 2 have the same spacing as that of the two parallel microstrip lines 13, 14 of the fixed plate 1. When the fixed plate 1 and the sliding plate 2 are assembled together, the two legs 231, 232 of the U-shaped microstrip line 23 and the two parallel microstrip lines 24, 25 of the sliding plate 2 overlap the two parallel microstrip lines 13, 14 of the fixed plate 1. Accordingly, the U-shaped microstrip line 23 defines a signal transmission path which couples the two parallel microstrip lines 13, 14 of the fixed plate 1. The signal transmission path is coupled to the two parallel microstrip lines 13, 14 of the fixed plate 1 at two points, i.e., a first coupling point 234 between a first leg 231 and the connecting bar 233, and a second coupling point 235 between a second leg 232 and the connecting bar 233. The location of the two coupling points 234, 235 is fixed with respect to the sliding plate 2, but the location of two corresponding coupling points on the two parallel microstrip lines 13, 14 of the fixed plate 1 varies as the sliding plate 2 slides relative to the fixed plate 1.

Each of the two parallel microstrip lines 24, 25 of the sliding plate 2 has a first end 241, 251 adjacent to the U-shaped microstrip line 23, and an opposite second end 242, 252 ("first point"). A distance between each of the two coupling points 234, 235 of the U-shaped microstrip line 23 and the second end 242, 252 of a corresponding one of the two parallel microstrip lines 24, 25 of the sliding plate 2 is a half-wavelength of the target frequency. The location of the second ends 242, 252 of the two parallel microstrip lines 24, 25 is fixed with respect to the sliding plate 2, but the location of corresponding two points on the two parallel microstrip lines 13, 14 of the fixed plate 1 varies as the sliding plate 2 slides relative to the fixed plate 1.

Accordingly, when the fixed plate 1 and the sliding plate 2 are assembled together, an infinite impedance is introduced at a point on each of the two parallel microstrip lines 13, 14 of the fixed plate 1 that corresponds to the second end 242, 252 of a corresponding one of the two parallel microstrip lines 24, 25 of the sliding plate 2. Further, an infinite impedance is also introduced at the two coupling points on the two parallel microstrip lines 13, 14 of the fixed plate 1 that correspond to the two coupling points 234, 235 of the U-shaped microstrip line 23.

A distance between each of the two coupling points 234, 235 of the U-shaped microstrip line 23 and the first end 241, 251 of a corresponding one of the two parallel microstrip lines 24, 25 of the sliding plate 2, or in other words, a length of each of the two parallel microstrip lines 24, 25 of the sliding plate 2, can be set depending on the range of adjustment. The two parallel microstrip lines 24, 25 of the sliding plate 2 are arranged such that during a travel of the sliding plate 2, the first end 241, 251 is always coupled to a corresponding one of the two parallel microstrip lines 13, 14 of the fixed plate 1, and the second end 242, 252 does not overlap with the two parallel microstrip lines 13, 14 of the fixed plate 1 or at most overlaps with a corresponding one of the two parallel microstrip lines 13, 14 of the fixed plate 1 only at a limit position of the travel of the sliding plate 2 where the second end 242, 252 is directly above the right end point of a corresponding one of the two parallel microstrip lines 13, 14.

Although not shown, a layer of insulating film is provided on the bottom surface of the sliding plate 2 and covers the U-shaped microstrip line 23 and the two parallel microstrip lines 24, 25 of the sliding plate 2. The insulating film prevents direct contact of the U-shaped microstrip line 23 and the two parallel microstrip lines 24, 25 of the sliding plate 2 with the two parallel microstrip lines 13, 14 of the fixed plate 1, but still allows electrical coupling between the U-shaped microstrip line 23 or the two parallel microstrip lines 24, 25 of the sliding plate 2 and the two parallel microstrip lines 13, 14 of the fixed plate 1. As a result, the third-order intermodulation distortion is suppressed.

A distance between each of the two coupling points 234, 235 of the U-shaped microstrip line 23 and the second end 242, 252 of a corresponding one of the two parallel microstrip lines 24, 25 of the sliding plate 2 is not limited to a half-wavelength of the target frequency, but may be any integral multiple of the half-wavelength.

Figure 7A:
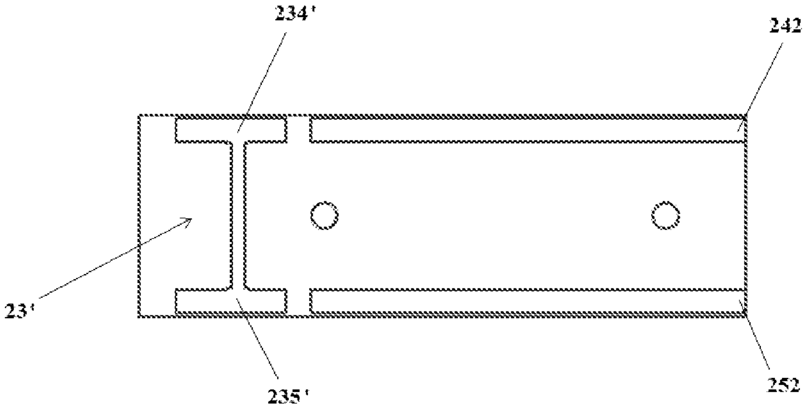
FIG. 7A is a bottom view showing a first variation of the sliding plate.
Figure 7B:
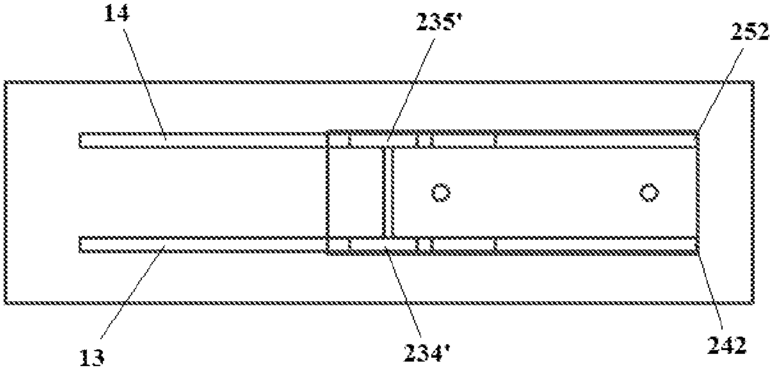
FIG. 7B is a diagram showing a state where the sliding plate according to the first variation is assembled with the fixed plate.

FIG. 7A is a bottom view showing a first variation of the sliding plate 2, and FIG. 7B is a diagram showing a state where the sliding plate 2 according to the first variation is assembled with the fixed plate 1. In the first variation of the sliding plate 2, the U-shaped microstrip line 23 as described above is replaced with an H-shaped microstrip line 23'. A distance between each of the two coupling points 234', 235' of the H-shaped microstrip line 23' and the second end 242, 252 of a corresponding one of the two parallel microstrip lines 24, 25 of the sliding plate 2 is an integral multiple of the half-wavelength.

Figure 8A:
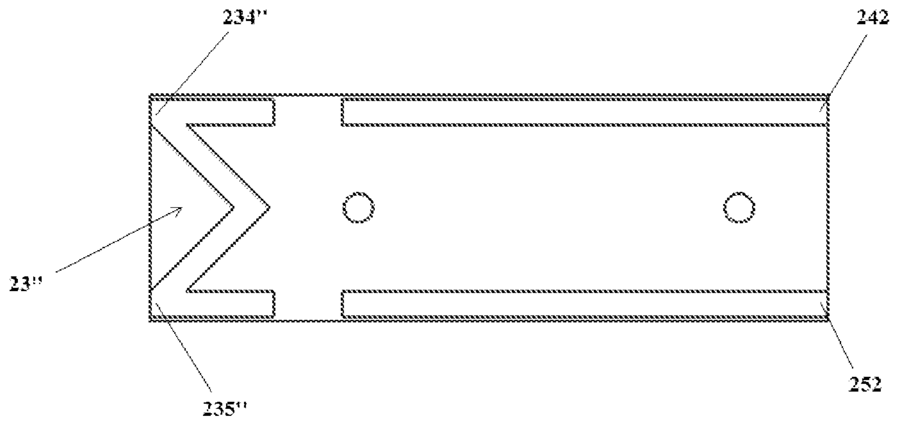
FIG. 8A is a bottom view showing a second variation of the sliding plate.
Figure 8B:
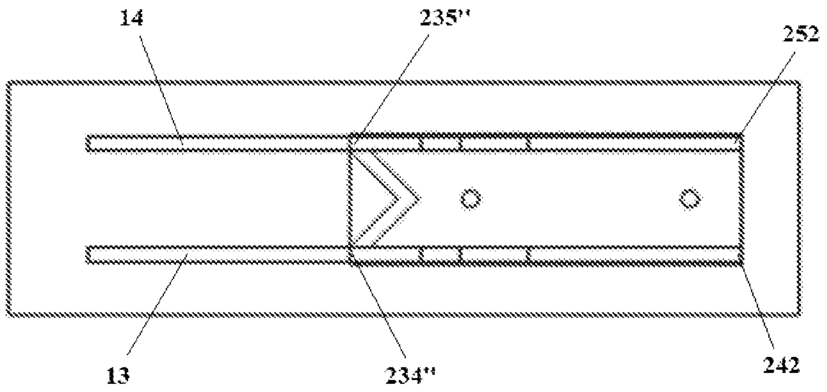
FIG. 8B is a diagram showing a state where the sliding plate according to the second variation is assembled with the fixed plate.

FIG. 8A is a bottom view showing a second variation of the sliding plate 2, and FIG. 8B is a diagram showing a state where the sliding plate 2 according to the second variation is assembled with the fixed plate 1. In the second variation of the sliding plate 2, the U-shaped microstrip line 23 as described above is replaced with an M-shaped microstrip line 23". A distance between each of the two coupling points 234", 235" of the M-shaped microstrip line 23" and the second end 242, 252 of a corresponding one of the two parallel microstrip lines 24, 25 of the sliding plate 2 is an integral multiple of the half-wavelength.

Figure 9A:
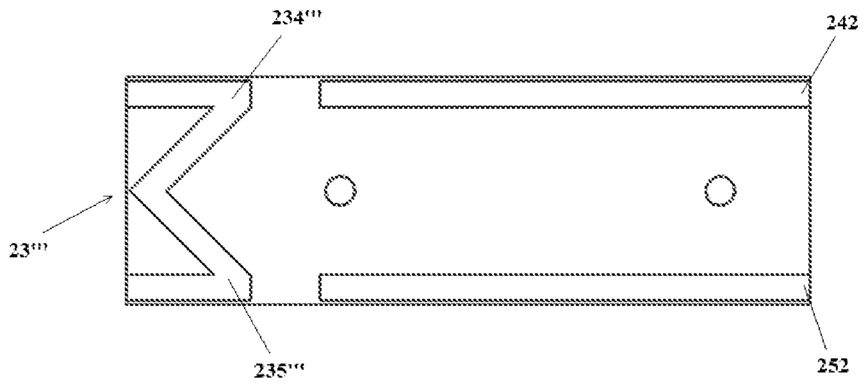
FIG. 9A is a bottom view showing a third variation of the sliding plate.
Figure 9B:
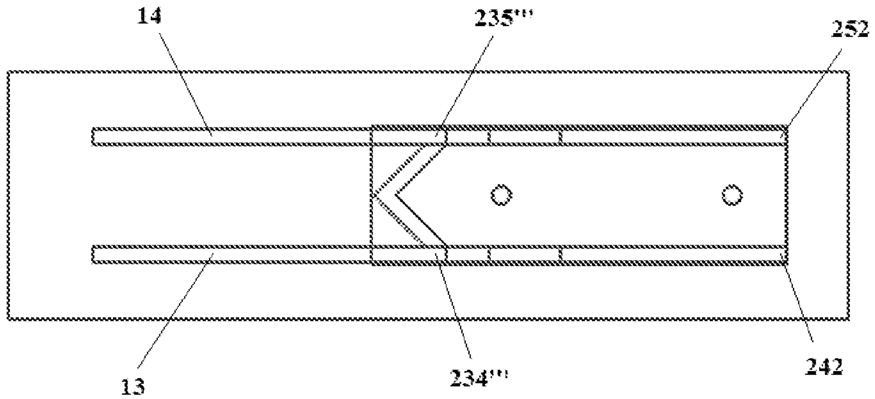
FIG. 9B is a diagram showing a state where the sliding plate according to the third variation is assembled with the fixed plate.

FIG. 9A is a bottom view showing a third variation of the sliding plate 2, and FIG. 9B is a diagram showing a state where the sliding plate 2 according to the third variation is assembled with the fixed plate 1. In the third variation of the sliding plate 2, the U-shaped microstrip line 23 as described above is replaced with a W-shaped microstrip line 23". A distance between each of the two coupling points 234", 235"

of the W-shaped microstrip line 23"" and the second end 242, 252 of a corresponding one of the two parallel microstrip lines 24, 25 of the sliding plate 2 is an integral multiple of the half-wavelength.

Besides the above variations, it can be readily appreciated by those skilled in the art that the U-shaped microstrip line 23 may be opened toward the right side, i.e., toward the two parallel microstrip lines 24, 25 of the sliding plate 2, or may be replaced with a V-shaped microstrip line opened toward either the left side or the right side. A bar-shaped microstrip line may also be employed. In this regard, it would suffice as long as the microstrip line provides a signal transmission path having two points electrically coupled to the two parallel microstrip lines 13, 14 of the fixed plate 1, and a distance between each of the two points and the second end 242, 252 of a corresponding one of the two parallel microstrip lines 24, 25 of the second plate 2 is an integral multiple of half-wavelength.

Figure 10:
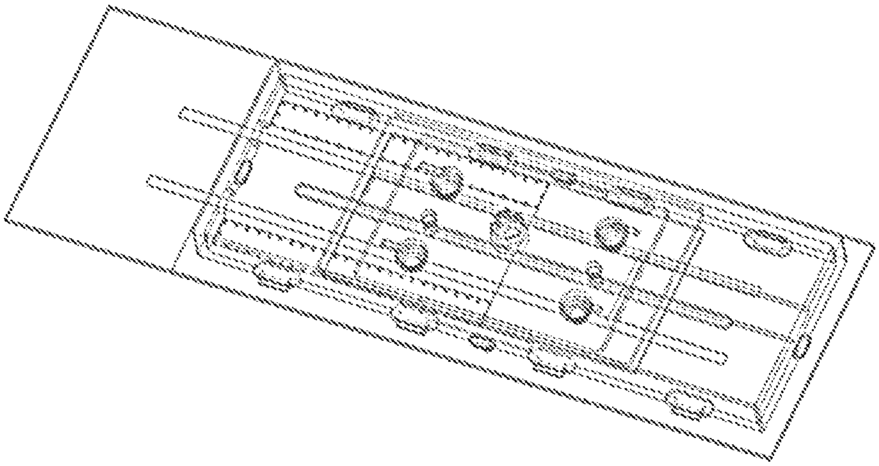
FIG. 10 is a diagram showing a phase shifter according to a second embodiment of the disclosure.
Figure 11:
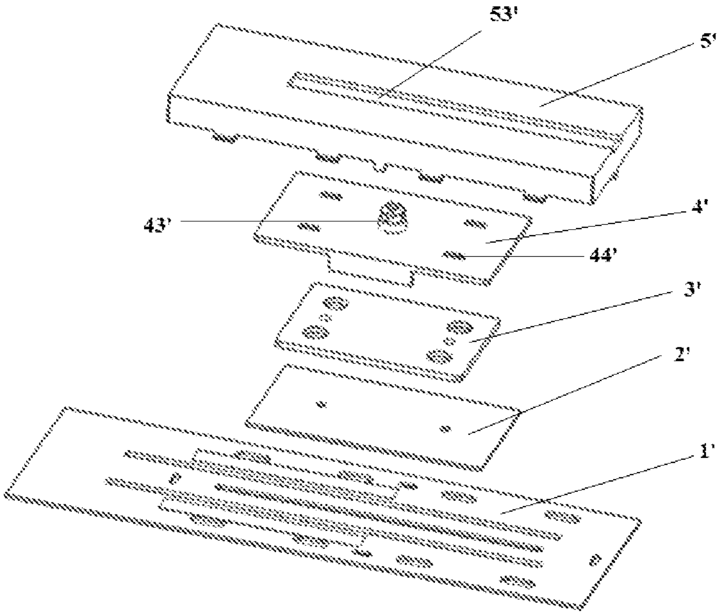
FIG. 11 is an explosive diagram of the phase shifter according to the second embodiment viewed from a top side.
Figure 12:
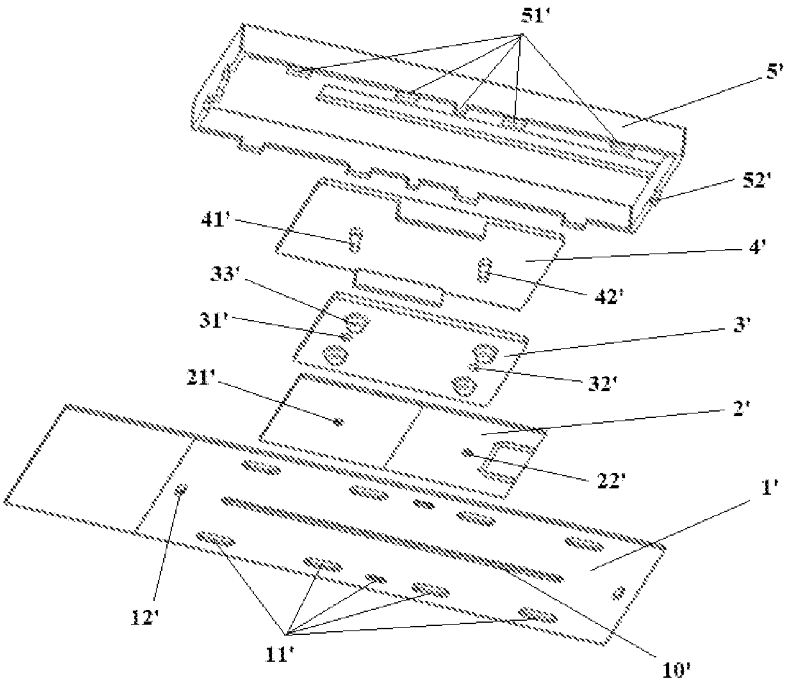
FIG. 12 is an explosive diagram of the phase shifter according to the second embodiment viewed from a bottom side.

Hereinafter, a phase shifter according to a second embodiment of the disclosure will be described with reference to FIGS. 10-15. FIG. 10 is a diagram showing the phase shifter according to the second embodiment of the disclosure, FIG. 11 is an explosive diagram showing the phase shifter according to the second embodiment viewed from a top side, and FIG. 12 is an explosive diagram showing the phase shifter according to the second embodiment viewed from a bottom side. As shown in FIGS. 10-12, the phase shifter according to the second embodiment includes a fixed plate ("first plate") 1', a sliding plate ("second plate") 2', a spacer plate 3', a drive plate 4', and a cover 5'.

The fixed plate 1' is mounted on a stationary member, such as an antenna reflector plate. The sliding plate 2', the spacer plate 3' and the drive plate 4' are fastened together, so as to form an assembly which is slidable relative to the fixed plate 1'. The cover 5' is fixed to the fixed plate 1' and defines a space for housing the assembly formed by the sliding plate 2', the spacer plate 3' and the drive plate 4'. In the illustrated embodiment, two pins 41', 42' protrude from a bottom surface of the drive plate 4', extend through corresponding holes 31', 32' formed in the spacer plate 3' and corresponding holes 21', 22' formed in the sliding plate 2', and are inserted into a guiding groove 10' formed in a central portion of the fixed plate 1'. Further, at tip ends of side walls of the cover 5', there is provided a plurality of lugs 51', 52', which can be inserted into corresponding holes 11', 12' formed in the fixed plate 1'. It should be noted that the way of fastening the sliding plate 2', the spacer plate 3' and the drive plate 4' together or fixing the cover 5' to the fixed plate 1' is not limited to the illustrated one.

Each of the fixed plate 1', the sliding plate 2', the spacer plate 3', the drive plate 4' and the cover 5' may be made of plastic, for example. As can be seen from FIG. 12, the spacer plate 3' is provided with four elastic parts 33', which may be made of rubber, for example. As can be seen from FIG. 11, the drive plate 4' is provided with a drive portion 43' on a central portion of its top surface. For example, the drive portion 43' may be connected to an output shaft of a step motor. A groove 53' is formed at a top plate of the cover 5', and the drive portion 43' can slide in the groove 53'. On the top surface of the drive plate 4', four protrusions 44' are provided, which can reduce friction between the drive plate 4' and the top plate of the cover 5'.

Figure 13:
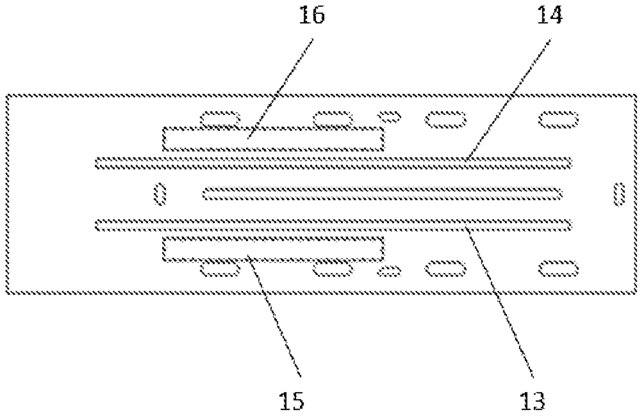
FIG. 13 is a top view of a fixed plate of the phase shifter according to the second embodiment.

Hereinafter, the fixed plate 1' and the sliding plate 2' will be described in detail with reference to FIGS. 13-15. FIG. 13 illustrates a top view of the fixed plate 1', FIG. 14 illustrates a bottom view of the sliding plate 2', and FIG. 15 illustrates an assembly of the fixed plate 1' and the sliding plate 2'.

As shown in FIG. 13, two parallel microstrip lines 13, 14 are provided on a top surface ("first surface") of the fixed plate 1'. The guiding groove 10' and two holes 12' are located between the two parallel microstrip lines 13, 14. Further two grounds 15, 16 are provided on the first plate 1' beside the two parallel microstrip lines 13, 14. In the illustrated embodiment, the two grounds 15, 16 are located at the outer side of the two parallel microstrip lines 13, 14. In another embodiment, the two grounds 15, 16 may be arranged between the two parallel microstrip lines 13, 14. In a further embodiment, the first plate 1' may be provided with a single ground.

Figure 14:
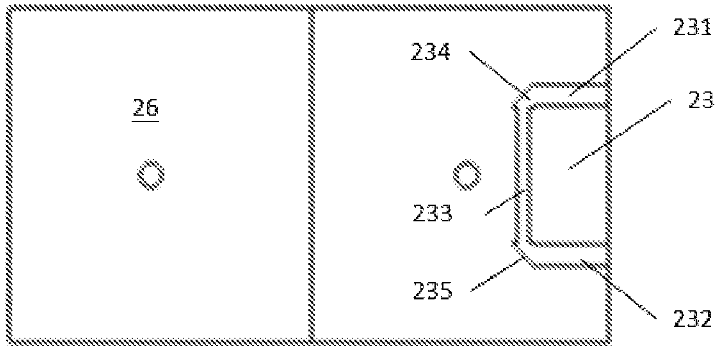
FIG. 14 is a bottom view of a sliding plate of the phase shifter according to the second embodiment.
Figure 15:
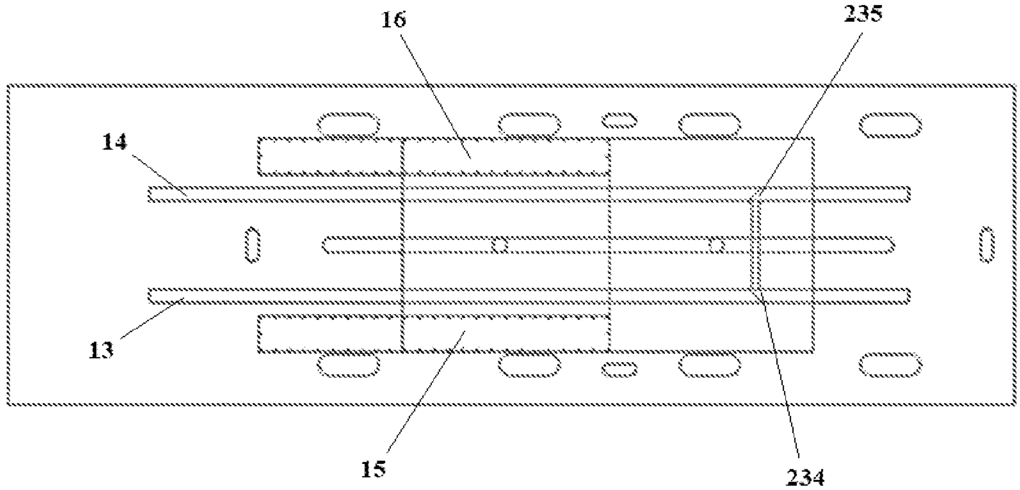
FIG. 15 is a diagram showing an assembly of the fixed plate and the sliding plate of the phase shifter according to the second embodiment.

As shown in FIG. 14, a U-shaped microstrip line ("first part") 23 is provided on the right end ("one side") of a bottom surface ("second surface") of the sliding plate 2', and a conductive body ("second part") 26 is provided on the left end ("the other side") of the bottom surface of the sliding plate 2'. The U-shaped microstrip line 23 and the conductive body 26 form a means that is electrically coupled to the two parallel microstrip lines 13, 14 of the fixed plate 1' when the fixed plate 1' and the sliding plate 2' are assembled together.

More specifically, the U-shaped microstrip line 23 has two legs 231, 232 and a connecting bar 233. The spacing between the two legs 231, 232 of the U-shaped microstrip line 23 is the same as the spacing between the two parallel microstrip lines 13, 14 of the fixed plate 1'. When the fixed plate 1' and the sliding plate 2' are assembled together, the two legs 231, 232 of the U-shaped microstrip line 23 overlap the two parallel microstrip lines 13, 14 of the fixed plate 1'. Accordingly, the U-shaped microstrip line 23 defines a signal transmission path which couples the two parallel microstrip lines 13, 14 of the fixed plate 1'. The signal transmission path is coupled to the two parallel microstrip lines 13, 14 of the fixed plate 1' at two points, i.e., a first coupling point 234 between a first leg 231 and the connecting bar 233, and a second coupling point 235 between a second leg 232 and the connecting bar 233. The location of the two coupling points 234, 235 is fixed with respect to the sliding plate 2', but the location of two corresponding coupling points on the two parallel microstrip lines 13, 14 of the fixed plate 1' varies as the sliding plate 2' slides relative to the fixed plate 1'.

The conductive body 26 is a sheet made of metal, such as copper. The conductive body 26 is not limited to be a metal sheet, and may be a metal bar. The conductive body 26 couples the two parallel microstrip lines 13, 14 of the fixed plate 1' to the grounds 15, 16. A distance between each of the two coupling points 234, 235 of the U-shaped microstrip line 23 and a right end of the conductive body 26 is a quarter-wavelength of the target frequency. The location of the right end of the conductive body 26 is fixed with respect to the sliding plate 2', but the location of corresponding two points ("second point") on the two parallel microstrip lines 13, 14 of the fixed plate 1', which corresponds to the right end of the conductive body 26 of the sliding plate 2', varies as the sliding plate 2' slides relative to the fixed plate 1'.

Accordingly, when the fixed plate 1' and the sliding plate 2' are assembled together, an infinitely small impedance is introduced at a point on each of the two parallel microstrip lines 13, 14 of the fixed plate 1 that corresponds to the right end of the conductive body 26 of the sliding plate 2'. Further, an infinite impedance is introduced at the two coupling points on the two parallel microstrip lines 13, 14 of the fixed plate 1' that correspond to the two coupling points 234, 235 of the U-shaped microstrip line 23.

The conductive body 26 of the sliding plate 2' and the grounds 15, 16 of the fixed plate 1' are arranged such that during a travel of the sliding plate 2', the conductive body 26 is always coupled to the grounds 15, 16 and the two parallel microstrip lines 13 14 of the fixed plate 1'.

Although not shown, a layer of insulating film is provided on the bottom surface of the sliding plate 2' and covers the U-shaped microstrip line 23 and the conductive body 26 of the sliding plate 2'. The insulating film prevents direct contact of the U-shaped microstrip line 23 and the conductive body 26 of the sliding plate 2' with the two parallel microstrip lines 13, 14 of the fixed plate 1', but still allows electrical coupling between the U-shaped microstrip line 23 or the conductive body 26 of the sliding plate 2' and the two parallel microstrip lines 13, 14 or the grounds 15, 16 of the fixed plate 1'. As a result, the third-order intermodulation distortion is suppressed.

A distance between each of the two coupling points 234, 235 of the U-shaped microstrip line 23 and the right end of the conductive body 26 of the sliding plate 2' is not limited to a quarter-wavelength of the target frequency, but may be any odd multiple of the quarter-wavelength.

Like in the first embodiment, it can be readily appreciated by those skilled in the art that the U-shaped microstrip line 23 in the second embodiment may be replaced with a microstrip line having a shape of H, V, W, M or a bar. In this regard, it would suffice as long as the microstrip line provides a signal transmission path having two points electrically coupled to the two parallel microstrip lines 13, 14 of the fixed plate 1', and a distance between each of the two points and the conductive body 26 is an odd multiple of a quarter-wavelength.

The present disclosure also relates to an antenna unit comprising the above-mentioned phase shifter, and a base station comprising the antenna unit.

According to the embodiments of the present disclosure, the slide plate provides a means electrically coupled to the two parallel microstrip lines on the fixed plate, and the means defines a signal transmission path which couples the two parallel microstrip lines, and introduces an infinite impedance at two coupling points on the two parallel microstrip lines where the signal transmission path is coupled to the two parallel microstrip lines. Compared with existing phase shifting solutions, the phase shifter according to the present disclosure does not need to introduce an extra length of transmission line. Accordingly, the transmission of signal on the transmission line will not be affected during the whole travel of the sliding plate for phase shifting, the insertion loss is reduced, and the insertion phase is shorter.

References in the present disclosure to "an embodiment", "another embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A phase shifter, comprising:

a first plate; and a second plate slidable relative to the first plate, wherein two parallel microstrip lines are provided on a first surface of the first plate, and a means electrically coupled to the two parallel microstrip lines is provided on a second surface of the second plate that faces to the first surface of the first plate, the means defining a signal transmission path which couples the two parallel microstrip lines and introducing an infinite impedance at two coupling points on the two parallel microstrip lines where the signal transmission path is coupled to the two parallel microstrip lines, wherein the means introduces an infinite impedance at two first points on the second plate, and a distance between each of the two coupling points and a corresponding first point is an integral multiple of half-wavelength, wherein the means comprises a first part on one side of the second surface of the second plate and a separate second part on the other side of the second surface of the second plate, the first part defining the signal transmission path and having two points that correspond to the two coupling points on the two parallel microstrip lines of the first plate, the second part consisting of two parallel microstrip lines each of which has a first end adjacent to the first part and an opposite second end having a respective one of the first points, and wherein a distance between each of the two points of the first part and the second end of a corresponding one of the two parallel microstrip lines of the second plate is an integral multiple of half-wavelength.

2. The phase shifter according to claim 1, wherein the two parallel microstrip lines of the second plate have the same spacing as that of the two parallel microstrip lines of the first plate.

3. The phase shifter according to claim 1, wherein the two parallel microstrip lines of the second plate are arranged such that during a travel of the second plate, the first end is always coupled to a corresponding one of the two parallel microstrip lines of the first plate, and the second end does not overlap with the two parallel microstrip lines of the first plate or at most overlaps with a corresponding one of the two parallel microstrip lines of the first plate only at a limit position of the travel of the second plate.

4. The phase shifter according to claim 1, wherein the first part is a microstrip line having a shape of U, H, V, W or M.

5. The phase shifter according to claim 1, wherein a layer of insulating film is provided on the second surface of the second plate and covers the means.

6. A phase shifter, comprising:

a first plate; and a second plate slidable relative to the first plate, wherein two parallel microstrip lines are provided on a first surface of the first plate, and a means electrically coupled to the two parallel microstrip lines is provided on a second surface of the second plate that faces to the first surface of the first plate, the means defining a signal transmission path which couples the two parallel microstrip lines and introducing an infinite impedance at two coupling points on the two parallel microstrip lines where the signal transmission path is coupled to the two parallel microstrip lines, wherein the means introduces an infinitely small impedance at a second point on each of the two parallel microstrip lines of the first plate and a distance between each of the two coupling points and a corresponding second point is an odd multiple of a quarter-wavelength, wherein the means comprises a first part on one side of the second surface of the second plate and a separate second part on the other side of the second surface of the second plate, the first part defining the signal transmission path and having two points that correspond to the two coupling points on the two parallel microstrip lines of the first plate, the second part comprising a conductive body which couples the two parallel microstrip lines of the first plate to a ground, and wherein a distance between each of the two points of the first part and the conductive body is an odd multiple of a quarter-wavelength.

7. The phase shifter according to claim 6, wherein the ground is provided on the first plate beside the two parallel microstrip lines.

8. The phase shifter according to claim 6, wherein the conductive body of the second plate and the ground are arranged such that during a travel of the second plate, the conductive body is always coupled to the ground and the two parallel microstrip lines of the first plate.

9. The phase shifter according to claim 6, wherein the conductive body is a sheet or a bar made of metal.

10. The phase shifter according to claim 9, wherein the metal is copper.

11. An antenna unit, comprising:

a phase shifter comprising a first plate, and a second plate slidable relative to the first plate, wherein two parallel microstrip lines are provided on a first surface of the first plate, and a means electrically coupled to the two parallel microstrip lines is provided on a second surface of the second plate that faces to the first surface of the first plate, the means defining a signal transmission path which couples the two parallel microstrip lines and introducing an infinite impedance at two coupling points on the two parallel microstrip lines where the signal transmission path is coupled to the two parallel microstrip lines, wherein the means introduces an infinite impedance at two first points on the second plate, and a distance between each of the two coupling points and a corresponding first point is an integral multiple of half-wavelength, wherein the means comprises a first part on one side of the second surface of the second plate and a separate second part on the other side of the second surface of the second plate, the first part defining the signal transmission path and having two points that correspond to the two coupling points on the two parallel microstrip lines of the first plate, the second part consisting of two parallel microstrip lines each of which has a first end adjacent to the first part and an opposite second end having a respective one of the first points, and wherein a distance between each of the two points of the first part and the second end of a corresponding one of the two parallel microstrip lines of the second plate is an integral multiple of half-wavelength.

12. A base station, comprising an antenna unit according to claim 11.

* * * * *